United States Patent
Cantero Lázaro et al.

(10) Patent No.: US 8,976,410 B2
(45) Date of Patent: Mar. 10, 2015

(54) TEMPORARILY REDUCING THROUGHPUT OF A PRINTING SYSTEM

(71) Applicant: Hewlett-Packard Development Company, L.P., Houston, TX (US)

(72) Inventors: Marina Cantero Lázaro, Barcelona (ES); Joan Albert Jorba Closa, Barcelona (ES); Antonio Gracia Verdugo, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 35 days.

(21) Appl. No.: 13/856,725

(22) Filed: Apr. 4, 2013

(65) Prior Publication Data
US 2014/0300925 A1   Oct. 9, 2014

(51) Int. Cl.
G06K 15/00 (2006.01)
G06F 3/12 (2006.01)
G06K 15/10 (2006.01)
B41J 2/045 (2006.01)

(52) U.S. Cl.
CPC .......... *G06K 15/407* (2013.01); *B41J 2/04508* (2013.01); *B41J 2/04566* (2013.01)
USPC ............ 358/1.5; 358/1.12; 358/1.13; 347/14; 347/23

(58) Field of Classification Search
CPC .......................... B41J 2/04508; B41J 2/04566
USPC ...................... 358/1.5, 1.12, 1.13; 347/14, 23
See application file for complete search history.

(56) References Cited

U.S. PATENT DOCUMENTS

| | | | |
|---|---|---|---|
| 4,622,562 A | 11/1986 | Pipkorn | |
| 7,213,915 B2 | 5/2007 | Tsutsumi | |
| 2010/0321445 A1 | 12/2010 | Grant | |
| 2012/0013663 A1* | 1/2012 | Snyder et al. | 347/14 |

\* cited by examiner

*Primary Examiner* — Fred Guillermety

(57) ABSTRACT

According to one example, there is provided a method of controlling a printing system. The method comprises: obtaining a print job to print on a substrate; obtaining a value of a factor material to an undesirable condition occurring; determining a quantity of printing fluid to be deposited on a substrate when printing a portion of the print job; determining, based on the obtained value and the determined quantity of printing fluid to be deposited, whether the undesirable condition is likely to occur whilst printing the portion of the print job; and temporarily reducing the throughput of the printing system whilst printing the portion of the print job where it is determined that the undesirable condition is likely to occur whilst printing the portion of the print job.

18 Claims, 3 Drawing Sheets

TEMPORARILY REDUCING THROUGHPUT OF A PRINTING SYSTEM

BACKGROUND

Many printing systems use printing fluids, such as inks. Some inks may be dye-based, and other inks may be pigment-based. After printing fluid has been printed on a substrate, the liquid carrier is evaporated leaving printed marks on the substrate.

In some printing fluids the liquid carrier is water, whereas in other inks other solvents are used.

Many printing systems offer a choice of selectable print modes. A print mode defines a collection of one or multiple printing system parameters that may be applied to a printing system for printing a print job.

One common print mode is a 'draft' print mode, which may configure the printer system to print a print job at the highest speed achievable by the printing system (for example, using a low number of passes in a scanning inkjet printing system) but with a reduced print quality compared to printing using other print modes.

Another common print mode is an 'optimum quality' print mode, which may configure the printer to print a print job at the highest print quality achievable by the printing system, but with a reduced throughput (for example, using a higher number of passes in a scanning inkjet printing system) compared to printing using other print modes.

Depending on the print mode chosen when printing a print job the quantity of printing fluid deposited on a substrate in any time period may vary considerably.

BRIEF DESCRIPTION

Examples, or embodiments, of the invention will now be described, by way of non-limiting example only, with reference to the accompanying drawings, in which.

DETAILED DESCRIPTION

Figure 1:
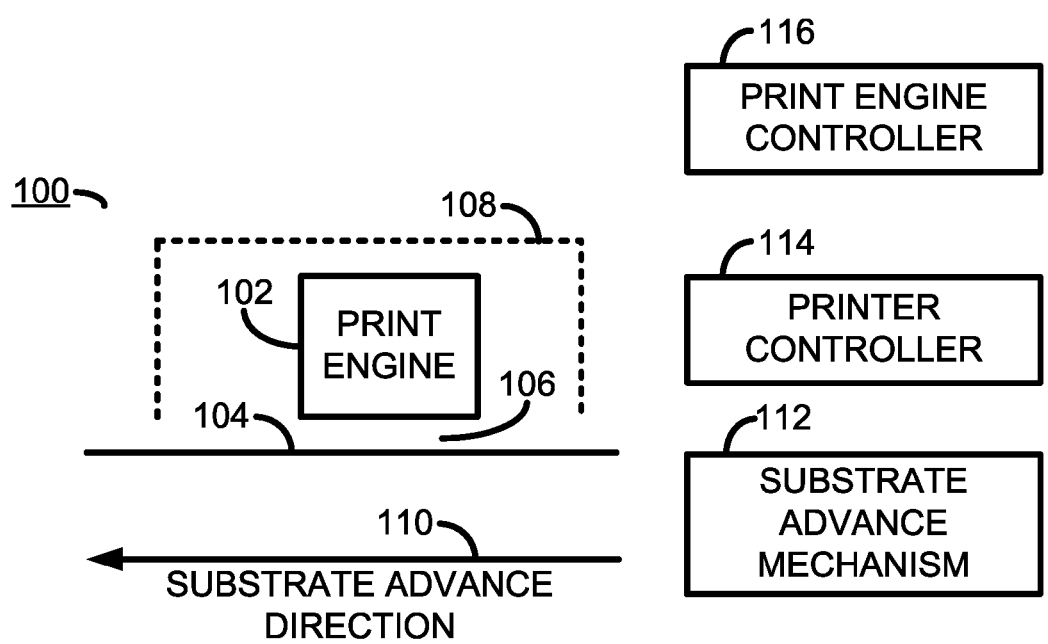
FIG. 1 is a block diagram showing a simplified view of a printing system according to one example.

Referring now to FIG. 1, there is shown a simplified illustration of a printing system 100 according to one example.

The printing system 100 comprises a print engine 102 for depositing printing fluid on a portion of a substrate 104 positioned in a print zone 106. Printing fluids may, for example, include inks, pre-treatments, and post-treatments such as varnish.

In one example the print engine 102 comprises one or multiple inkjet printheads (not shown). In one example the print engine 102 comprises one or multiple thermal inkjet printheads. In another example the print engine 102 comprises one or multiple piezo inkjet printheads.

Operation of the printing system 100 is generally controlled by a printer controller 114.

The printheads are controllable by a print engine controller 116, in accordance with image data, such as printhead control data, representing an image to be printed, to eject drops of printing fluid from printhead nozzles (not shown) onto substrate pixel locations of a substrate positioned in the print zone 106.

In one example the printheads are mounted on a carriage (not shown) that is movable bi-directionally in an axis perpendicular to, and in a plane parallel thereto, the substrate advance direction 106, such that the printheads are able to print an image swath along the whole, or substantially the whole, width of the substrate 104.

Each swath may be printed using one or multiple passes of the carriage across the width of the substrate 104. Once each swath is printed the substrate 104 is advanced in the substrate advance direction 110 by a suitable substrate advance mechanism 112 so that a subsequent swath may be printed adjacent to or overlapping a previously printed swath.

In another example the printheads of the print engine 102 are arranged in a page-wide array configuration, for example on a print bar, which spans the whole, or substantially the whole, width of the substrate 104. In this example, the substrate advance mechanism 112 continuously advances the substrate 104 under the print zone in the substrate advance direction 110 using a suitable substrate advance mechanism 112.

In some examples the print engine 102 and print zone 106 are partially enclosed by a housing 108.

The printing system 100 prints a print job using a collection of printing system configuration parameters defined in a print mode. The printing system 100 may use a default print mode, or an operator may select from a choice of multiple print modes depending on particular requirements. The choice of print mode may be made, for example, through a print driver or via a user interface (not shown) of the printing system 100.

When using some print modes or printing system configurations, one or more undesirable, or perceivably undesirable, printing system conditions may occur under certain circumstances.

For example, when using a print mode that causes a printing system to print at a high speed (hereinafter referred to as a high-speed print mode) the rate at which printing fluid drops may be deposited on a substrate is elevated compared to using a print mode that causes a printing system to print at a lower speed.

The actual quantity of printing fluid deposited on a substrate in any given period, or ink flux, is, of course, dependent on both the print mode and the content of the print job being printed.

One example undesirable condition that may occur is where the ink flux is such that it may lead to different printing fluids (e.g. different colored inks) coalescing or bleeding into each other before the printing fluids have an opportunity to adequately dry. This may cause print quality issues. The precise conditions under which such a condition occurs may also be dependent on environmental conditions, such as the ambient temperature and relative humidity levels, in addition to the ink flux.

Another example undesirable condition that may occur is where the ink flux is such that it may lead to the appearance of a visible haze. Such a haze may occur when the concentration of evaporated solvents (present in some printing fluids) in the air around the substrate reaches saturation. Although such hazes are generally not hazardous, their presence may unnecessarily alarm printing system operators.

Another example undesirable condition that may occur is where the ink flux is such that it may lead to a greater quantity of printing fluid being deposited on a substrate than can be adequately dried using a substrate drying system of a printing system, leading to incomplete drying of the substrate. Such a condition may lead to print quality issues such as smudging or smearing of printed content.

Other such undesirable conditions may also occur.

Examples described herein aim to prevent one or multiple undesirable conditions from occurring, as will be described below in further detail.

Figure 2:
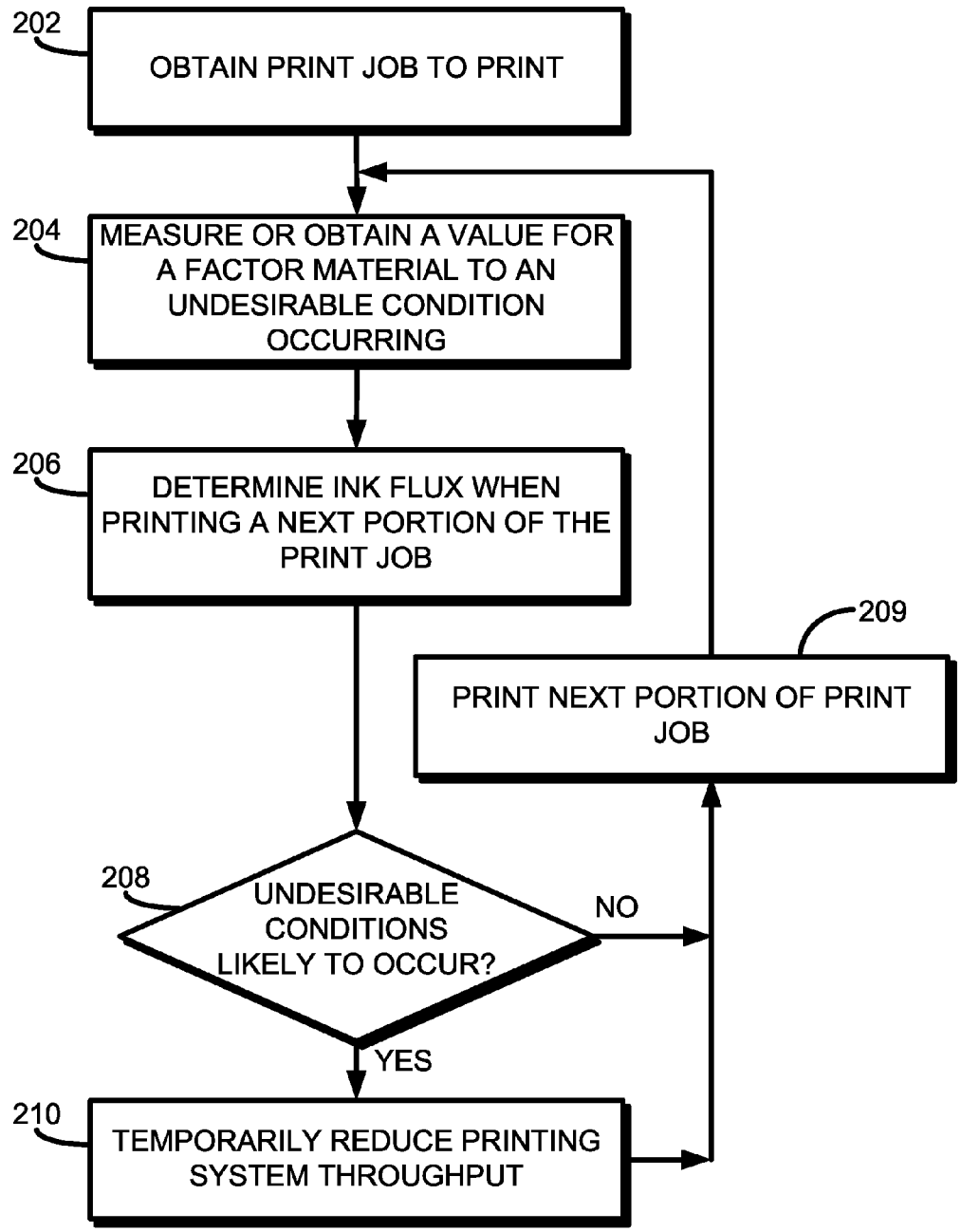
FIG. 2 is a flow diagram outlining a method of operating a printing system according to one example.

Referring now to FIG. 2 there is shown a flow diagram outlining a method of operating a printing system according to one example.

In one example the method may be performed by the printer controller 114.

At block 202 the printer controller 114 obtains a print job to be printed on the printing system 100.

Depending on the undesirable condition that it is desired to prevent, the printer controller may be preconfigured with details of the one or multiple factors that are material to the undesirable condition occurring, in addition to the ink flux.

For example, to prevent coalescence or a visible haze from occurring, a factor may be the ambient temperature.

At block 204, the printer controller 114 obtains or measures values of factors material to an undesirable condition occurring. The factors for which values are to be measured or obtained may be obtained, for example, from a suitable storage device, such as a disk drive or memory device, may be input to the printing device through a human operator, or may be obtained in any other appropriate manner.

In one example, the printing system 100 additionally comprises one or multiple sensors such as temperature sensors, humidity sensors, or the like. In another example, the printing system 100 may obtain data from one or multiple external sensors, for example using a suitable wireless communication protocol.

At block 206, the printer controller 114 determines, or estimates, the ink flux that will be attained when a portion of the print job is printed. It should be noted that the determined ink flux is determined prior to the portion of the print job being printed In one example, the portion of the print job is the portion of the print job that may be printed in a predetermined number of printhead passes, or a predetermined number of printed swathes. In other examples other portions may be chosen.

In one example the ink flux when printing a portion of the print job to be printed is obtained from a print engine controller, such as the print engine controller 116.

For example, in some printing systems the print engine controller 116 may comprise an application specific integrated circuit (ASIC) that enables the number of printing fluid drops to be ejected from different nozzles of an inkjet printhead when printing a print job, or a portion of a print job, to be determined in advance of printing fluid drops being ejected. In some printing systems the print engine controller 116 may determine both a number of and a size of printing fluid drops to be deposited, for example in the case where inkjet printheads in the printing system are capable of ejecting variable size fluid drops.

From the number of printing fluid drops to be deposited and the size of the portion of the print job to be printed, the ink flux may be determined.

In one example the determined ink flux is an average ink flux when printing a portion of the print job.

At block 208 the printer controller 114 uses the measured or obtained value(s) to determine a threshold ink flux level at or above which it is likely than an undesirable condition will occur.

The printer controller 114 then determines whether the determined ink flux will reach or exceed the threshold ink flux level when printing the next portion of the print job.

For example, to prevent ink coalescence from occurring the printer controller 114 may determine, for a given temperature or range of temperatures, a threshold ink flux at or above which ink coalescence may be assumed to occur.

In another example, to prevent a vapor haze occurring the printing controller 114 may determine, for a given temperature or range of temperatures, a threshold ink flux at or above which a visible vapor haze may occur.

If the printer controller 114 determines (block 208) that the determined threshold ink flux level is not likely to be reached or exceeded, the printer controller 114 controls the printing system to print (block 209) the next portion of the obtained print job. This is based on the assumption that if the threshold ink flux level is not likely to be reached than no undesirable condition will occur.

If, however, the printer controller 114 determines (block 208) that the threshold ink flux level will be reached or exceeded, the printer controller 114 temporarily reduces (block 210) the throughput, or printing speed, of the printing system 100 to prevent the threshold ink flux level from being reached. Accordingly, the undesirable condition may be prevented from occurring.

In one example, where the printing system 100 is a scanning inkjet printing system, the temporary throughput reduction may be applied by adding a time delay at the end of each printing pass. The length of the time delay may be determined by calculating a delay period that would bring, or maintain, the ink flux below the determined ink flux threshold level. In one example a delay in the range of up to 1 to 2 seconds may be added, although in other examples larger or smaller delays may be added.

In one example, the throughput reduction is chosen such that it does not reduce the overall throughput of the selected print mode below that of other print modes offered by the printing system 100 that are capable of producing higher-quality output. For example, if too great a throughput reduction is added to a high-speed draft quality print mode, better print quality and faster printing speeds may be achievable by printing using a different print mode.

In another example, where the printing system 100 is a scanning inkjet printing system, the temporary throughput reduction may be achieved by reducing the speed of the carriage during each print pass. In this example, however, the print engine controller 116 will need to make corresponding changes to the printhead firing data to compensate for the slower moving carriage.

In another example, where the printing system 100 is a page-wide array printing system, the temporary throughput reduction may be achieved by the print engine controller 116 reducing the firing frequency of the inkjet printheads. In this example the printer controller 114 will additionally need to control the speed of the substrate advance mechanism 112 to compensate for the reduced firing frequency of the printheads.

At block 209, the printer controller 114 controls the printing system to continue printing a portion of the obtained print job using the determined temporary throughput reduction.

As previously mentioned, the above-described method may be performed by the printer controller 114.

Figure 3:
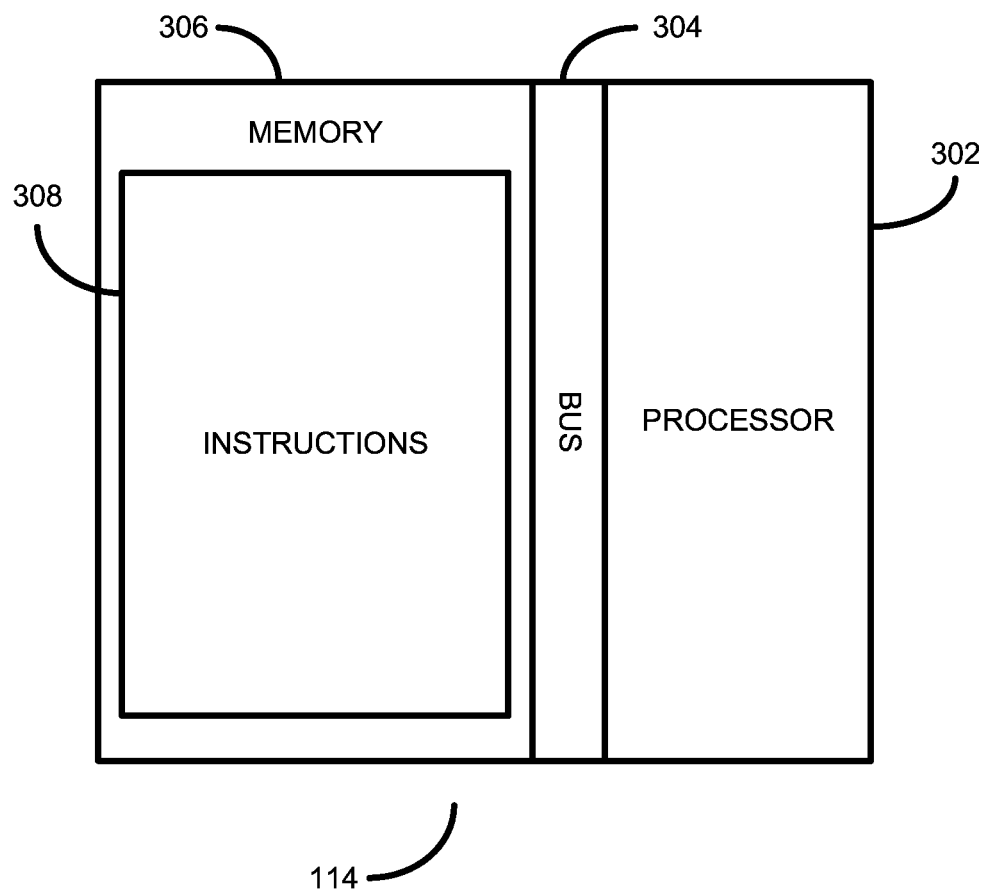
FIG. 3 is a block diagram showing a simplified view of a printer controller according to one example.

In one example, the printer controller 114 comprises a processor 302, such as a microprocessor or microcontroller, that is coupled to, and is in communication with via a communications buss 304, a memory 306, as shown in FIG. 3. The memory 306 stores processor understandable instructions 308 that, when executed by the processor 302, cause the processor 302 to perform the method or methods described herein. Advantageously, the examples described herein allow for a wide range of undesirable conditions to be avoided during operation of a printing system. Furthermore, many printing systems have built-in sensors, such as temperature sensors, thus the example described herein may be implemented without making any changes to printer hardware.

It will be appreciated that examples and embodiments of the present invention can be realized in the form of hardware, software or a combination of hardware and software. As described above, any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are examples of machine-readable storage that are suitable for storing a program or programs that, when executed, implement examples of the present invention. Examples described herein may be conveyed electronically via any medium such as a communication signal carried over a wired or wireless connection and examples suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A method of controlling a printing system, comprising:
   receiving a print job to print on a substrate;
   obtaining, by a printer controller, a value of a factor material to an undesirable condition occurring;
   determining, by the printer controller, a flux of printing fluid to be deposited on the substrate when printing a portion of the print job, the flux of the printing fluid being a quantity of the printing fluid to be deposited on the substrate in a given period of time;
   determining, by the printer controller, based on the obtained value of the factor and the determined flux of printing fluid to be deposited, whether the undesirable condition is likely to occur while printing the portion of the print job; and
   temporarily reducing, by the printer controller, a throughput of the printing system while printing the portion of the print job, in response to determining that the undesirable condition is likely to occur while printing the portion of the print job, wherein temporarily reducing the throughput of the printing system comprises not reducing the throughput below that of a higher quality print mode of the printing system.

2. The method of claim 1, wherein obtaining the value of the factor comprises obtaining one of: a temperature value; a humidity value; a substrate characteristics value; a printing fluid characteristic value; and an environmental characteristic value.

3. The method of claim 1, wherein determining whether the undesirable condition is likely to occur comprises:
   determining, based on the obtained value of the factor, a threshold flux of the printing fluid to be deposited while printing the portion of the print job at or above which the undesirable condition is likely to occur; and
   comparing the determined threshold flux with the determined flux of the printing fluid to be deposited when printing the portion of the print job.

4. The method of claim 1, wherein the undesirable condition is one of: ink coalescence; a visible vapor haze; and incomplete substrate drying.

5. The method of claim 1, wherein determining whether the undesirable condition is likely to occur comprises determining, based on the obtained value of the factor, a threshold flux of the printing fluid to be deposited while printing the portion of the print job at or above which the undesirable condition is likely to occur, and
   wherein temporarily reducing the throughput of the printing system comprises reducing the throughput by an amount such that the threshold flux is not exceeded while printing the portion of the print job.

6. The method of claim 1, wherein the printing system is a scanning inkjet printing system comprising a scanning carriage on which are installed one or multiple printheads, and wherein reducing the throughput comprises reducing a speed of the carriage during each printing pass and reducing by a corresponding amount a firing frequency of the one or multiple printheads on the carriage.

7. The method of claim 1, wherein the printing system is a page-wide array printing system comprising an array of printheads, and wherein reducing the throughput comprises reducing a substrate advance speed and reducing by a corresponding amount a firing frequency of the printheads.

8. A method of controlling a printing system, comprising:
   receiving a print job to print on a substrate;
   obtaining, by a printer controller, a value of a factor relating to a specified condition occurring;
   determining, by the printer controller, a quantity of printing fluid to be deposited on the substrate when printing a portion of the print job;
   determining, by the printer controller based on the obtained value of the factor and the determined quantity of printing fluid to be deposited, whether the specified condition is likely to occur while printing the portion of the print job; and
   temporarily reducing, by the printer controller, a throughput of the printing system while printing the portion of the print job, in response to determining that the specified condition is likely to occur while printing the portion of the print job, wherein temporarily reducing the throughput of the printing system comprises not reducing the throughput below that of a higher quality print mode of the printing system.

9. The method of claim 8, wherein the printing system is a scanning inkjet printing system and wherein reducing the throughput comprises adding a delay at the end of each printing pass.

10. The method of claim 8, wherein determining the quantity of the printing fluid comprises determining a flux of the printing fluid, the flux being a quantity of the printing fluid to be deposited on the substrate in a given period of time.

11. A printing system to print printing fluid on a substrate, comprising:
    a printer controller to:
        receive a print job to print on a substrate;
        obtain a value of a factor related to a specified condition occurring;
        determine, based on the obtained value, a threshold ink flux level above which the specified condition may occur while printing the print job;
        determine, prior to printing a portion of the print job, an ink flux level when printing that portion; and reduce a speed at which the printing system prints to prevent the determined ink flux level reaching the determined threshold ink flux level, wherein reducing the speed at which the printing system prints is based on not reducing the speed to below a speed that corresponds to a higher quality print mode of the printing system.

12. The printing system of claim 11, configured to prevent a visible haze from occurring while printing the print job, wherein the value of the factor comprises an ambient temperature value, and
wherein determining the threshold ink flux level is based on the ambient temperature value.

13. The printing system of claim 11, wherein the value of the factor related to the specified condition occurring comprises one of: a temperature value; a humidity value; a substrate characteristic value; a printing fluid characteristic value; and an environmental characteristic value.

14. The printing system of claim 11, wherein the printing system is a scanning inkjet printing system, and wherein the printer controller is to reduce the speed by adding a delay at the end of each printing pass.

15. The printing system of claim 11, wherein the printing system is a scanning inkjet printing system and wherein the printer controller is to reduce the speed by reducing a speed of a carriage during each printing pass and reducing by a corresponding amount a firing frequency of printheads.

16. The printing system of claim 11, wherein the printing system is a page-wide array printing system comprising an array of printheads, and wherein the printer controller is to reduce the speed by reducing a substrate advance speed and reducing by a corresponding amount a firing frequency of printheads.

17. The printing system of claim 11, wherein the printer controller is to reduce the speed such that the threshold ink flux level is not exceeded while printing the portion of the print job.

18. The printing system of claim 11, wherein the determined ink flux level is a quantity of printing fluid deposited on the substrate in a given time period.

\* \* \* \* \*